United States Patent [19]

McClain

[11] Patent Number: 5,743,214
[45] Date of Patent: Apr. 28, 1998

[54] LIGHT FOR CLIPPERS

[76] Inventor: Nancy A. McClain, 4009 Allard Rd., Medina, Ohio 44256

[21] Appl. No.: 674,830

[22] Filed: Jul. 3, 1996

[51] Int. Cl.[6] ............................................. A01K 13/00
[52] U.S. Cl. ............................................................. 119/601
[58] Field of Search ............................. 119/610, 601, 119/617, 600; 132/273, 275, 288; 362/84, 109, 115, 119, 120, 226, 227

[56] References Cited

U.S. PATENT DOCUMENTS

| | | | |
|---|---|---|---|
| 2,164,148 | 6/1939 | Swanson | 362/226 |
| 2,595,287 | 5/1952 | Perry | 362/115 |

*Primary Examiner*—Thomas Price
*Attorney, Agent, or Firm*—Roger D. Emerson

[57] ABSTRACT

A lighting apparatus to be retrofitted to a clipping apparatus for grooming animals is disclosed which includes a light bulb for lighting the clipping apparatus, a power supply apparatus for supplying power to the light bulb, and a canopy for covering the light bulb and for dispersing light produced by the light bulb. The light source may also be built directly into the clipping apparatus. A method of grooming an associated animal using the clipping apparatus is also disclosed that includes the steps of attaching the light source to the clipping apparatus and grooming the associated animal using the clipping apparatus.

17 Claims, 4 Drawing Sheets

LIGHT FOR CLIPPERS

BACKGROUND OF INVENTION

1. Field of Invention

This invention pertains to the art of methods and apparatuses for clipping or grooming animals with clippers, and more specifically to methods and apparatuses for providing a light to illuminate the clipping area and the clippers.

2. Description of the Related Art

In the past, clippers were not fitted or supplied with light sources. The lack of a light source directed to the clipping area of the animal made seeing the area being clipped by the groomer difficult, particularly on dark-haired animals. With the clipping area dark, the odds of the groomer making a mistake or injuring the animal were increased. Independent light sources such as overhead lights and lamps proved to be ineffective in solving this problem due to shadows and the movement of the animal being groomed.

Applicant recognized the need to provide a light source attached directly to the clippers to illuminate the area of the animal being groomed. The increase in light in the grooming area provided by the present invention enables the groomer to see what is being cut, thereby reducing grooming mistakes and injuries to the animal. Applicant's design allows the present invention to be retrofitted to existing clippers without significant cost, or to be built into new clippers.

The present invention contemplates a new and improved method and apparatus for clipping the fur or hair of an animal by providing a light to illuminate the grooming area which is simple in design, effective in use, and overcomes the foregoing difficulties and others while providing better and more advantageous overall results.

SUMMARY OF THE INVENTION

In accordance with the present invention, a new and improved apparatus and method for clipping the hair and fur of animals is provided by adding a light to the apparatus which illuminates the area to be clipped, thereby reducing the odds for error in grooming the animal that could injure the animal.

More particularly, in accordance with the present invention, a lighting apparatus to be retrofitted to a clipping apparatus for grooming animals includes a light bulb for lighting the clipping apparatus, a power supply apparatus for supplying power to the light bulb, and a canopy for covering the light bulb and for dispersing light produced by the light bulb.

According to one aspect of the present invention, clippers for grooming animals include a clipping apparatus for clipping hair and fur, a light bulb for lighting the clipping apparatus, a power supply apparatus for supplying power to the light bulb, and a canopy for covering the light bulb and for dispersing light produced by the light bulb.

According to another aspect of the present invention, a method of grooming an associated animal using a clipping apparatus that includes clippers, a light source, and an attaching apparatus for attaching the light source to the clippers includes the steps of attaching the light source to the clippers using the attaching apparatus, and grooming the associated animal using the clippers.

One advantage of the present invention is its ability to illuminate the area of an animal being groomed, particularly dark-haired animals.

Another advantage of the present invention is that it enables a groomer to see the area of the animal being groomed better than under typical lighting conditions, thereby reducing the risks of grooming mistakes that could injure the animal.

Another advantage of the present invention is that the light source may be retrofitted to clippers which were not originally designed with a light source.

Another advantage of the present invention is that the canopy that surrounds the light bulb is multi-faceted to better disperse and direct the light in a forward direction.

Another advantage of the present invention is that the light source may be built into the clippers.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and herein.

DESCRIPTION OF THE PREFERRED EMBODIMENTS

Figure 1:
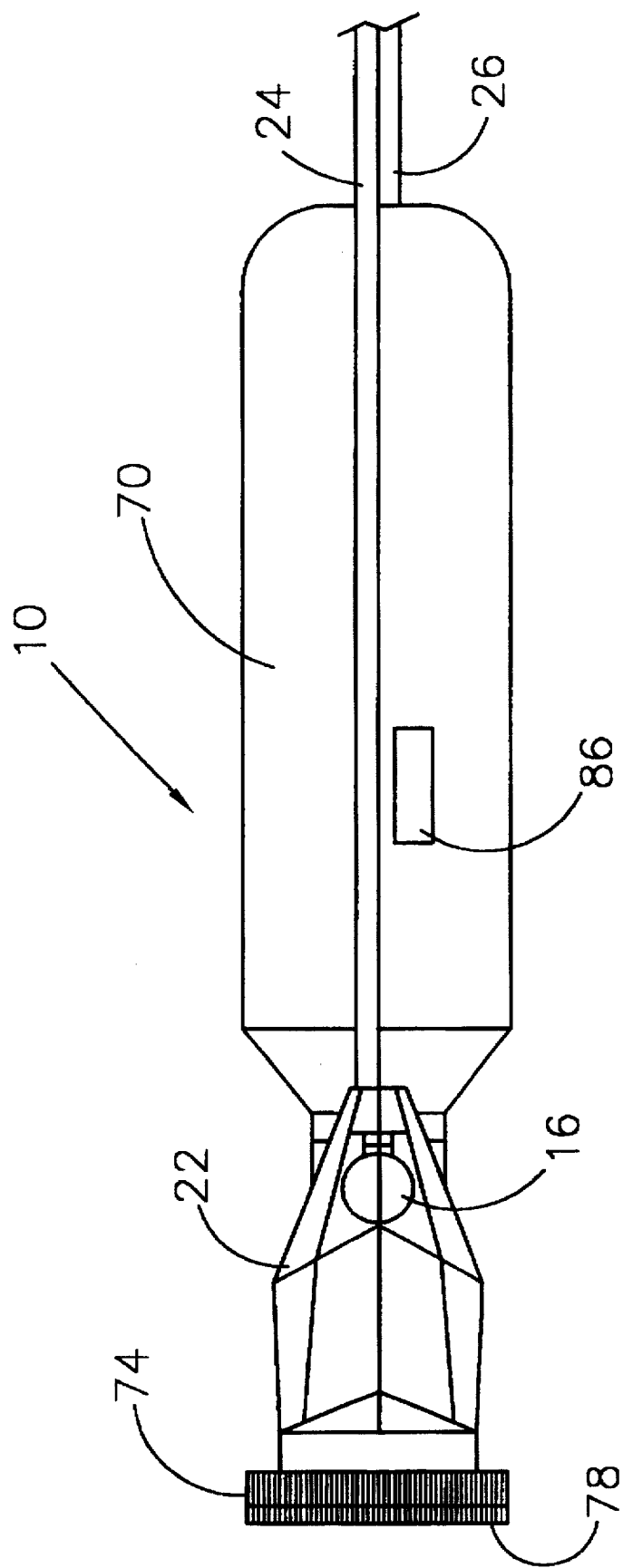
FIG. 1 is a top view of a set of clippers.

Referring now to the drawings wherein the showings are for purposes of illustrating a preferred embodiment of the invention only and not for purposes of limiting the same, FIG. 1 shows a top view of clippers 10 of the type used in the grooming of animals. The clippers 10 may be of any conventional design. The clippers 10 illustrated in FIG. 1 are electric, receiving power from electric power supply cord 26. The clippers 10 include a body 70 which is typically gripped by the operator's hand. The clipping means or teeth 74 are located at a first end 78 of the clippers 10. The teeth 74 move back and forth to clip the hair from the animal.

Figure 4:
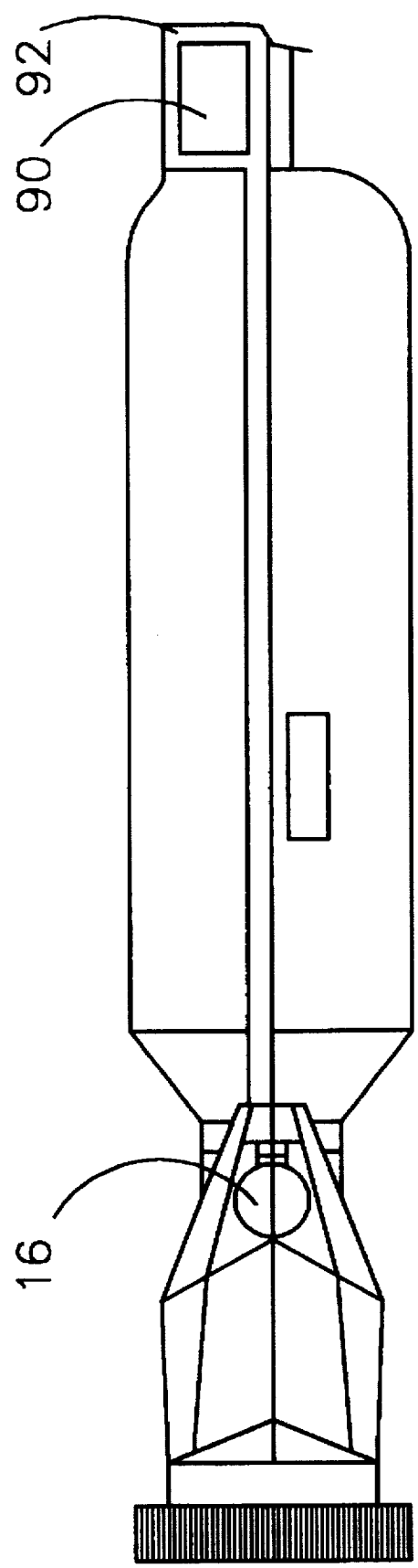
FIG. 4 is a top view of a set of clippers connected to means for receiving a battery.

The clippers 10 illustrated in FIG. 1 were not originally designed with a source of light to illuminate the area of the animal being groomed. A light source, such as a light bulb 16, may be retrofitted to the clippers 10 to illuminate the area of the animal's body which is being groomed. The light bulb 16 may be powered by a power cord 24 that is separate from the power supply cord 26 of the clippers 10. Another option is for the light bulb 16 to be powered from the same power cord 24 as the clippers 10. Alternatively, as shown in FIG. 4, the light bulb 16 may be powered by a battery 90 held in place by means 92 for receiving a battery or any other suitable power source. A power switch 86 means for turning the clippers 10 and/or the light 16 on and off is mounted on the clippers 10.

Figure 2:
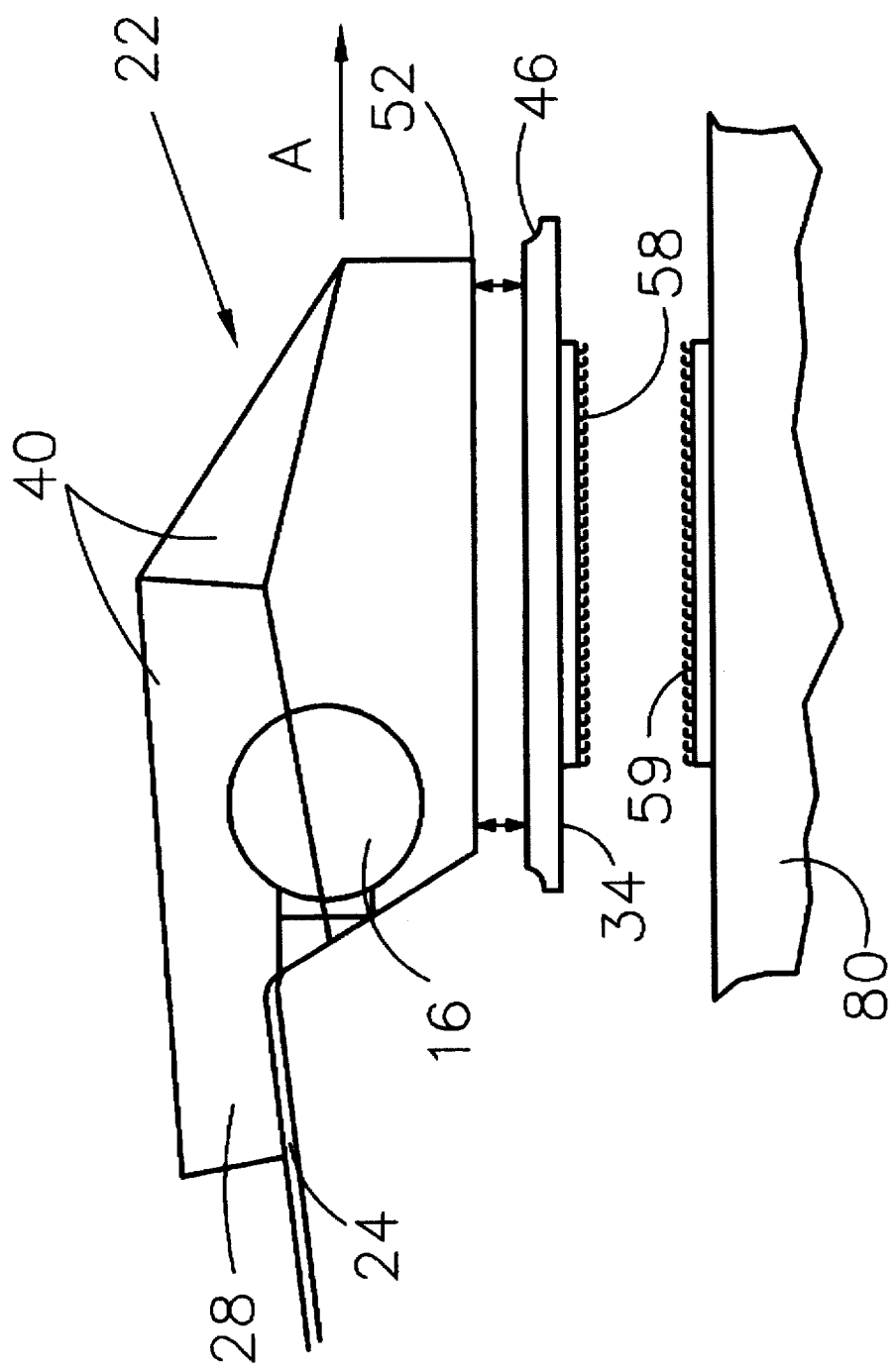
FIG. 2 is a side view of a canopy used with the present invention.

As shown in FIG. 2, the light bulb 16 is preferably surrounded by a canopy 22. The presently preferred canopy 22 has an upper portion 28 and a lower portion 34. The upper portion 28 of the canopy 22 preferably has a number of facets 40 and is generally dome-shaped. The facets 40 reflect, disperse and disperse light produced by the light bulb 16 in a generally forward direction as indicated by arrow A.

The canopy 22 also protects the animal and the operator of the clippers 10 from any uncomfortable heat generated by the light bulb 16. In the preferred embodiment of the present invention, the upper portion 28 of the canopy 22 has ten facets 40 arranged as illustrated in FIGS. 1 and 2. The lower portion 34 of the canopy 22 preferably is designed to snap together with the upper portion 28 of the canopy 22 via a press fit. However, any suitable method for snapping the upper portion 28 and lower portion 34 of the canopy 22 together may be employed. In FIG. 2, the lower portion 34 of the canopy 22 has a lowered outer edge surface 46 that corresponds to the lower edge 52 of the upper portion 28 of the canopy. The upper portion 28 and lower portion 34 fit together, with the lower portion being held by being in contact with the upper portion. Other methods of holding the upper portion 28 and lower portion 34 together such as using snaps or other fasteners may also be used.

Corresponding strips 58,59 of a hook and loop fastener are attached to the lower portion 34 of the canopy 22 and to the outer surface 80 of the clippers 10, respectively. The strips 58,59 of the hook and loop fastener that enables the light bulb 16 and canopy to be attached and detached from the clippers 10 as needed, and can be placed on the outer surface 80 of the clippers 10 as and where desired.

Figure 3:
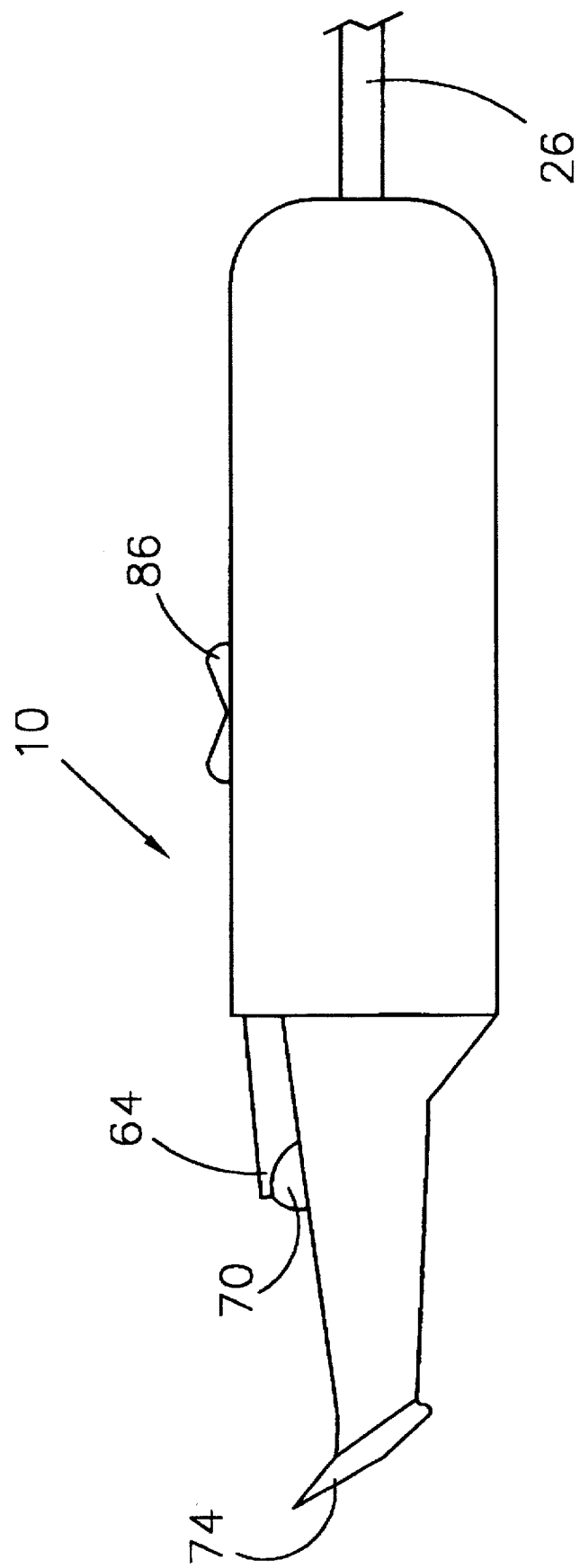
FIG. 3 is a side view of a set of clippers with a built-in light source.

FIG. 3 shows an alternate embodiment of the invention, where the clippers 10 have a built-in light source 64. The built-in light source 64 is preferably powered by the same power supply as the clippers 10, such as the power supply cord 26. The built-in light source 64 may be configured like the canopy 22 as shown in FIG. 2 with a number of facets 40 to direct the light, or the built-in light source may be configured as shown in FIG. 3 where the built-in light source is nested into the housing of the clippers 10 with a smaller canopy 70 that directs light to the clipping area. The built-in light source 64 may be smaller than the light bulb 16 and canopy 22 of the previous embodiment because it can be built into the clippers 10 to take advantage of the existing housing or body 70 for the clippers 10.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A lighting apparatus to be retrofitted to a clipping apparatus for grooming animals, said lighting apparatus comprising:

a light bulb;

power supply means for supplying power to said light bulb; and, a canopy, said canopy covering said light bulb and dispersing light generated by said light bulb.

2. The lighting apparatus of claim 1 wherein said canopy comprises:

an upper portion; and, a lower portion, said lower portion being securable to said upper portion and to said clipping apparatus.

3. The lighting apparatus of claim 2 wherein said upper portion of said canopy comprises:

a plurality of facets.

4. The lighting apparatus of claim 3 wherein said upper portion of said canopy comprises:

ten facets, each of said ten facets dispersing light from said light bulb.

5. The lighting apparatus of claim 2 wherein said lower portion of said canopy comprises:

attaching means for attaching said canopy to said clipping apparatus.

6. The lighting apparatus of claim 1 wherein said power supply means comprises:

a power cord suitably for being operatively connected to a source of alternating current electricity.

7. The lighting apparatus of claim 1 wherein said power supply means comprises:

means for receiving a battery.

8. The lighting apparatus of claim 1 wherein said power supply means comprises:

power switch means for turning said power supply means on and off.

9. A clipping apparatus for grooming animals, said clipping apparatus comprising:

clipping means for clipping hair and fur;

a light bulb for lighting said clipping apparatus;

power supply means for supplying power to said light bulb; and, a canopy, said canopy covering said light bulb and dispersing light produced by said light bulb.

10. The clipping apparatus of claim 9 wherein said canopy comprises:

an upper portion; and, a lower portion, said lower portion being substantially flat, said lower portion being securable to said upper portion.

11. The clipping apparatus of claim 10 wherein said upper portion of said canopy comprises:

a plurality of facets.

12. The clipping apparatus of claim 11 wherein said upper portion of said canopy comprises:

ten facets, each of said facets dispersing light from said light bulb in a generally forward direction.

13. The clipping apparatus of claim 10 wherein said lower portion of said canopy comprises:

attaching means for attaching said canopy to said clipping apparatus.

14. The clipping apparatus of claim 9 wherein said power supply means comprises:

a power cord.

15. The clipping apparatus of claim 9 wherein said power supply means comprises:

means for receiving a battery.

16. The clipping apparatus of claim 9 wherein said power supply means comprises:

power switch means for turning said power supply means on and off.

17. A lighting apparatus to be retrofitted to a clipping apparatus for grooming animals, said lighting apparatus comprising:

a light bulb;

power supply means for supplying power to said light bulb;

a canopy, said canopy covering said light bulb and dispersing light generated by said light bulb, said canopy having a plurality of facets, each of said facets dispersing light from said light bulb, said canopy having an upper portion and a lower portion, said lower portion being securable to said upper portion and to said clipping apparatus;

attaching means for attaching said canopy to said clipping apparatus, said attaching means comprising a first hook and loop fastening strip attached to said lower portion of said canopy and a second hook and loop fastening strip attached to said clipping apparatus, said first hook and loop fastening strip being selectively engagable with said second hook and loop fastening strip; and, power switch means for turning said power supply means on and off.

* * * * *